April 7, 1936.   C. MOTT   2,036,601
PRESSURE REGULATOR
Filed July 17, 1928
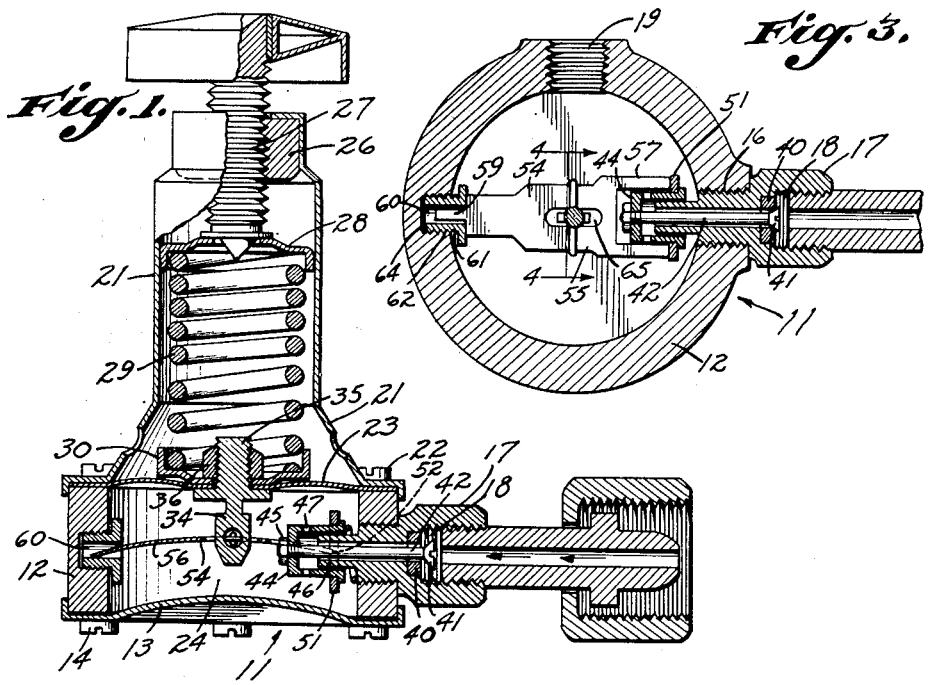
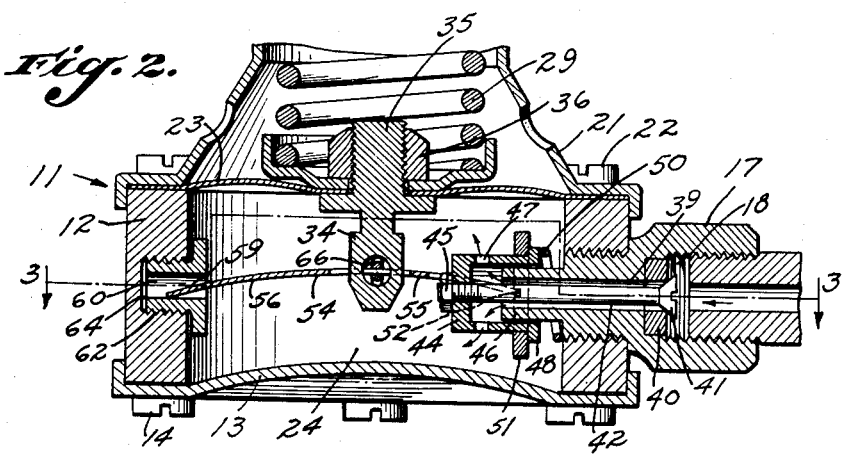
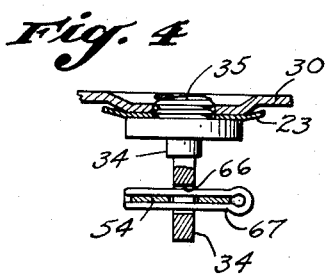
INVENTOR:
Chester Mott,
BY
Fad. W. Mauie
ATTORNEY.

Patented Apr. 7, 1936

2,036,601

UNITED STATES PATENT OFFICE 2,036,601

PRESSURE REGULATOR

Chester Mott, Denver, Colo., assignor, by mesne assignments, to Union Carbide and Carbon Corporation, a corporation of New York Application July 17, 1928, Serial No. 293,355

9 Claims. (Cl. 50—26)

My invention relates to pressure regulators of the type used in the oxy-acetylene welding industry for reducing the pressure of the gas from drum-pressure to torch-pressure.

The common form of regulator of this type comprises a body having an inlet and an outlet, and a chamber to which the inlet and outlet connect. One side of the chamber is closed by a diaphragm, against which diaphragm the gas in the chamber exerts a force. Means is provided for counteracting the force applied to the diaphragm by the gas in the chamber. The inlet of the device is provided with a valve which is opened and closed by mechanism associated with the diaphragm. When the pressure in the chamber increases above the intended amount, the diaphragm moves, against the operation of the pressure means, and closes the valve, and vice versa.

It is an object of this invention to provide a pressure regulator in which the valve seats in the direction of the flow of gas through the inlet.

It is a further object of the invention to provide a pressure regulator in which the valve is opened by a toggle-means.

It is a still further object of the invention to provide a pressure regulator in which the valve is opened by a toggle-means and in which it is closed by the assistance of gas-pressure passing through the inlet.

A further object of the invention is to provide a pressure regulator of this character in which the pressure of the toggle-spring for opening the valve, may be adjusted.

It is another object of the invention to provide a pressure regulator having a centralizing thimble attached to the valve and having a toggle-means which operates upon the thimble in order to actuate the valve.

It is also an object of my invention to provide a pressure regulator of the character mentioned in which a bowed toggle-spring is connected to the diaphragm, and in which the toggle-spring straightens as the pressure reduces in the chamber of the regulator in order to open the valve.

It is also an object of the invention to provide a pressure regulator in which the toggle-means is operated by a diaphragm or other pressure-responsive means which is controlled by a spring or other pressure-applying device.

A further object is to provide a pressure regulator in which the toggle-means cannot move independently of the diaphragm.

Other objects and advantages of the invention will be pointed out hereinafter.

Referring to the accompanying drawing in which my invention is illustrated,

Fig. 1 is an elevational sectional view showing the invention, the valve being open.

Fig. 2 is a fragmentary sectional view similar to Fig. 1, the valve being in closed position.

Fig. 3 is a horizontal sectional view taken on the line 3—3 of Fig. 2.

Fig. 4 is a fragmentary vertical sectional view taken on the line 4—4 of Fig. 3.

The form of the invention illustrated in the drawing has a body 11, which consists of a ring 12, to one edge of which a back-cap 13 is attached by screws 14. The body 11 has a threaded opening 16, into which a nipple 17 is screwed, this nipple 17 providing an inlet 18 for the body. The body also has an outlet 19. Connected to the ring 12 at the end opposite from the back-cap 13 is a bonnet 21. The bonnet 21 is secured in place by means of screws 22. Also held in place by screws 22 is a pressure-operated diaphragm 23. The body and diaphragm cooperate to provide a chamber 24.

The upper part of the bonnet 21 has a bonnet-nut 26, through which an adjustment screw 27 is threaded. The adjustment screw 27 has a spring-button 28 connected to the lower end thereof, which spring-button 28 receives the upper end of a compression spring 29. The lower end of the compression spring 29 is located in a cup 30 attached to the diaphragm 23. The cup 30 is attached to the diaphragm 23 by means of a stud 34 having a threaded end 35 which extends through the diaphragm 23, and has a nut 36 screwed thereonto.

The nipple 17, which provides the inlet 18, has an inlet passage 39, at the outer end of which an annular seat 40 is positioned. Adapted to engage the seat 40 is a valve 41 having a valve stem 42 which extends inwardly through the passage 39 into the chamber 24.

The inner end of the stem 42 has a thimble 44 attached to it by means of a nut 45. The thimble 44 is adapted to slide on a projection 46 of the nipple 17, this projection 46 serving as a support for the thimble. The thimble in turn acts as a support for the valve 41. The interior of the thimble 44 is adapted to communicate with the chamber 24 by means of openings 47. One end of the thimble 44 is provided with a flange 48, and placed between the flange 48 and the adjacent inner wall of the ring 12, is a drag-spring 50. The drag-spring 50 is adapted to compensate for the frictional resistance of the thimble 44.

Placed on the thimble 44 in engagement with the flange 48 is an annulus 51. The annulus 51 is provided with notches 52, which are diametrically opposed.

Arranged in the chamber 24 is a toggle in the form of a toggle-spring 54. The toggle-spring 54, although it is a one-piece resilient strip, in reality consists of a primary member 55 and a secondary member 56. The end of the primary member 55 is provided with bifurcations 57, the ends of which extend into the notches 52. The reason for bifurcating the end of the primary member 55 is to provide space for the thimble 44. The end of the secondary member 56 is reduced in width, as indicated at 59, and is extended into an opening 60 of an adjuster 61, and the shoulders adjacent the base of the part 59 engage the inner end of this adjuster. The adjuster 61 comprises a bushing which is provided with threads 62 and is received in a threaded recess 64 in the inside wall of the ring 12. Thus, adjacent its opposite ends, the toggle spring 54 is loosely associated with the body 12 and with the valve 41, the operative connection being such that the toggle spring 54 may freely rock at its points of contact with the members 51 and 61 as the toggle spring is bent or straightened. By rotating the adjuster 61 the toggle may be bent or straightened to procure proper adjustment. The center of the toggle 54 is provided with an opening 65, through which the lower part of the stud 34 is extended. The stud 34 is provided with a transverse opening 66. Extending on opposite sides of the central part of the toggle 54, and through the transverse opening 66 of the stud 34, is a retaining means in the form of a key 67.

The operation of this invention is as follows:

After the valve is open in the cylinder which retains the gas, the parts of the regulator occupy the positions shown in Fig. 1. It will be noted that the valve 41 is at this time open. The gas will flow through the inlet 18 into the chamber 24, and may pass from the chamber 24 through the opening 19, there being a suitable hose connected thereto. The screw 27 of the regulator is then adjusted so that the gas is reduced from cylinder-pressure to proper torch-pressure. By advancing the screw 27 downward, the reduction in pressure is decreased, and by retreating the screw upward the reduction in pressure is increased. In other words, when the toggle 54 is straightened, a greater pressure is exerted against the thimble 44, and the valve is opened a greater distance. When the toggle 54 is bent upwardly more than is shown in the drawing, the thimble is allowed to move toward the center of the chamber 24; consequently the valve moves toward closed position.

If the pressure in the chamber 24 tends to increase above the pressure to which the regulator is set, the diaphragm 23 is forced upward against the action of the spring 29 so that the toggle 54 is bent upwardly.

The bending of the toggle 54 upwardly causes the right end thereof to move toward the center of the chamber 24, and permits the valve 41 to move toward the seat 40. This, of course, restricts the flow of gas into the chamber 24 and consequently reduces the pressure therein. The reduction of pressure in the chamber 24 permits the diaphragm to move downward slightly, so that the valve 41 is again opened to allow a greater flow of gas. The diaphragm 23 soon adjusts itself into such a position that the valve 41 will be held in a proper position to maintain the desired gas pressure in the chamber 24.

The predominating feature of the invention is that the toggle 54 opens the valve 41 when it is straightened, and closes the valve when it is bent. This feature, in combination with the valve 41 closing with the pressure of the gas, is extremely important to the invention.

Another feature of the invention is the manner of supporting the valve 41. The supporting means consists of the thimble 44, which operates on the support or projection 46.

A further feature of the invention is the adjuster 61, by means of which the toggle 54 may be properly bowed so that the valve 41 will close when the diaphragm is in the normal position shown in Fig. 2.

A very important part of my invention is that the toggle is operated by the diaphragm 23 and the spring 29.

I claim as my invention:

1. In a pressure regulator, the combination of: a casing forming a chamber, having an inlet and an outlet; a diaphragm forming a wall of said chamber; means for placing a pressure on said diaphragm; a valve for closing said inlet, said valve being in said inlet and closing with the direction of a gas flowing through said inlet into said chamber; and means for opening said valve including a toggle for transmitting motion from said diaphragm to said valve; the ends of the toggle arms being in sliding connection respectively with the casing and valve; the sliding movement between the toggle and the valve being in an axial direction relative to the latter.

2. In a pressure regulator, the combination of: a body forming a chamber, said chamber having an inlet and an outlet; a diaphragm forming one wall of said chamber; means for exerting a pressure on said diaphragm; a valve for closing said inlet, said valve having a stem; a thimble connected to said stem; a toggle associated with said thimble; and means for connecting said toggle and said diaphragm.

3. In a pressure regulator, the combination of: a body forming a chamber, said chamber having an inlet and an outlet; a diaphragm forming one wall of said chamber; means for exerting a pressure on said diaphragm; a valve for closing said inlet, said valve having a stem; a thimble connected to said stem; a support for said thimble whereby same is retained in operating position; a toggle associated with said thimble; and means for connecting said toggle and said diaphragm.

4. In a pressure regulator, the combination of: a body forming a chamber, said chamber having an inlet and an outlet; a diaphragm forming one wall of said chamber; means for exerting a pressure on said diaphragm; a valve for closing said inlet, said valve having a stem; a thimble connected to said stem; a toggle, one end of said toggle being associated with said thimble, and the other end thereof being associated with said body; and means for connecting said toggle and said diaphragm.

5. In a pressure regulator, the combination of: a body forming a chamber, said chamber having an inlet and an outlet; a diaphragm forming one wall of said chamber; means for exerting a pressure on said diaphragm; a valve for closing said inlet, said valve having a stem; valve operating means including a thimble connected to said stem, a support for said thimble whereby same is retained in operating position, a toggle having one end associated with said thimble and the other end thereof associated with said body, and means for connecting said toggle and said diaphragm and an adjuster cooperating with said diaphragm and said valve operating means for bringing said valve and said diaphragm into desired co-relative positions of operation.

6. In a pressure regulator, the combination of: a body forming a chamber, said chamber having an inlet and an outlet; a diaphragm forming one wall of said chamber; means for exerting a pressure on said diaphragm; a valve for closing said inlet, said valve having a stem; a thimble connected to said stem; a toggle, one end of said toggle being associated with said thimble; an adjuster supporting the other end of said toggle; and means for connecting said toggle and said diaphragm.

7. In a pressure regulator, the combination of: a body forming a chamber, said chamber having an inlet and an outlet; a diaphragm forming one wall of said chamer; means for exerting a pressure on said diaphragm; a valve for closing said inlet, said valve having a stem; a thimble connected to said stem; a support for said thimble whereby same is retained in operating position; a toggle, one end of said toggle being associated with said thimble; an adjuster supporting the other end of said toggle; a spring operative to hold said thimble against said toggle; and means for connecting said toggle and said diaphragm.

8. In a pressure regulator, the combination of a body forming a chamber, said chamber having an inlet and an outlet; a valve controlling said inlet; and means for actuating said valve comprising a pressure-responsive diaphragm forming one wall of said chamber; a toggle operatively connected to said valve and to said diaphragm, said toggle comprising a resilient strip of metal; and supporting means adjacent the opposite ends of said strip, said supporting means comprising a bushing secured to the inner wall of said body and a thimble secured to said valve, said toggle having a portion of reduced width at one end for abutting against said bushing, and a bifurcation at the opposite end for engaging the opposite sides of said thimble.

9. In a pressure regulator, the combination of: a body forming a chamber, said chamber having an inlet and an outlet; a diaphragm adapted to form one wall of said chamber; means for exerting pressure on said diaphragm; a valve adapted to move in the direction of flow through said inlet so as to close said inlet; and means for actuating said valve including the combination of a toggle comprising a resilient strip, the ends of which are normally bowed away from said diaphragm, said toggle being compressed between the inner wall of said casing and the stem of said valve and being operable by said diaphragm to open said valve when said toggle is straightened and to close said valve when said toggle is bowed, and means including a bushing carried by the inner wall of said chamber for adjusting the position of one end of said toggle so as to vary the closing position of said valve.

CHESTER MOTT.